B. J. SLOAN.
RAKING MECHANISM FOR CLEANING THE GRATINGS OF WATER CHANNELS.
APPLICATION FILED AUG. 6, 1910.
986,231.
Patented Mar. 7, 1911.
3 SHEETS—SHEET 1.
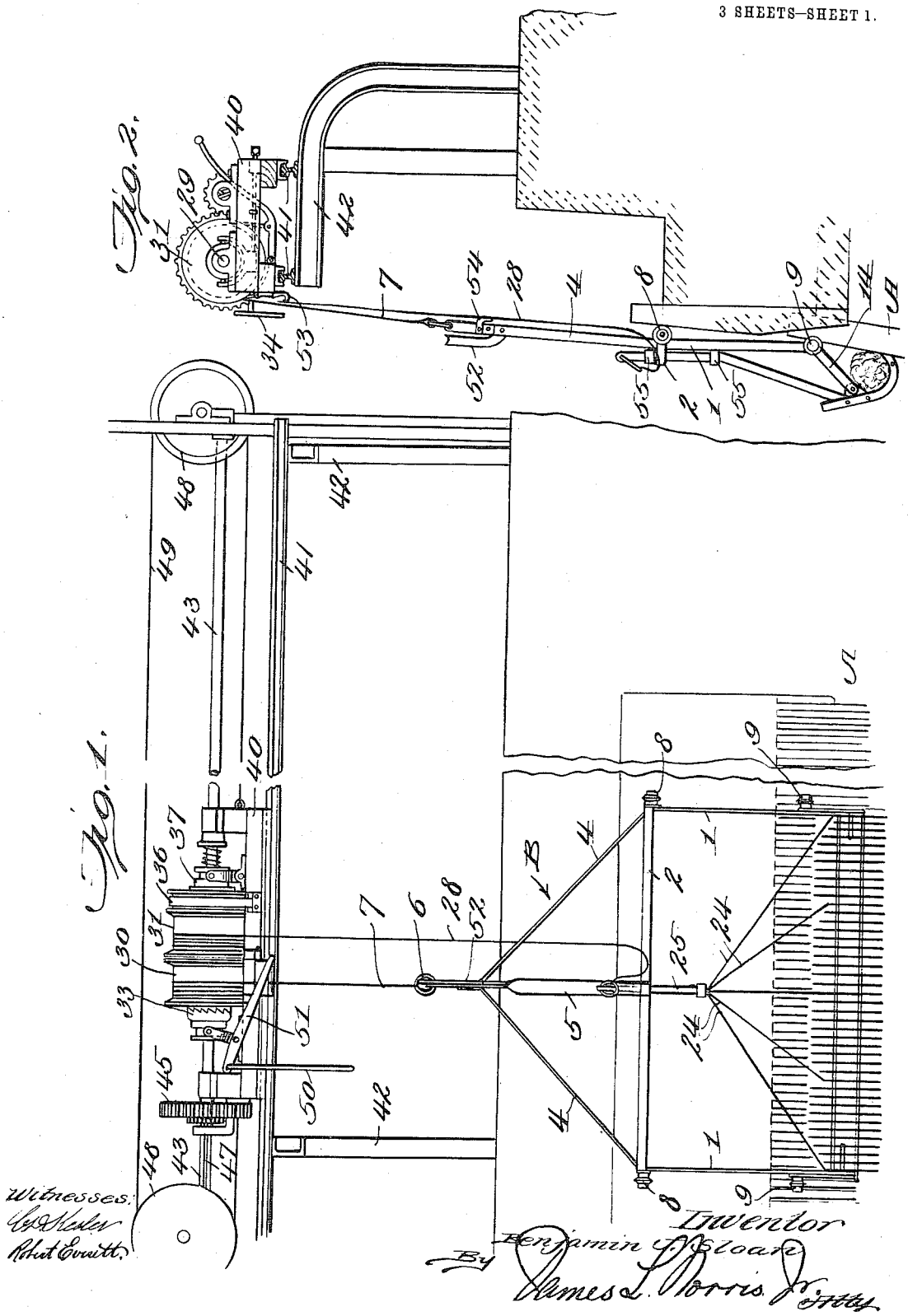

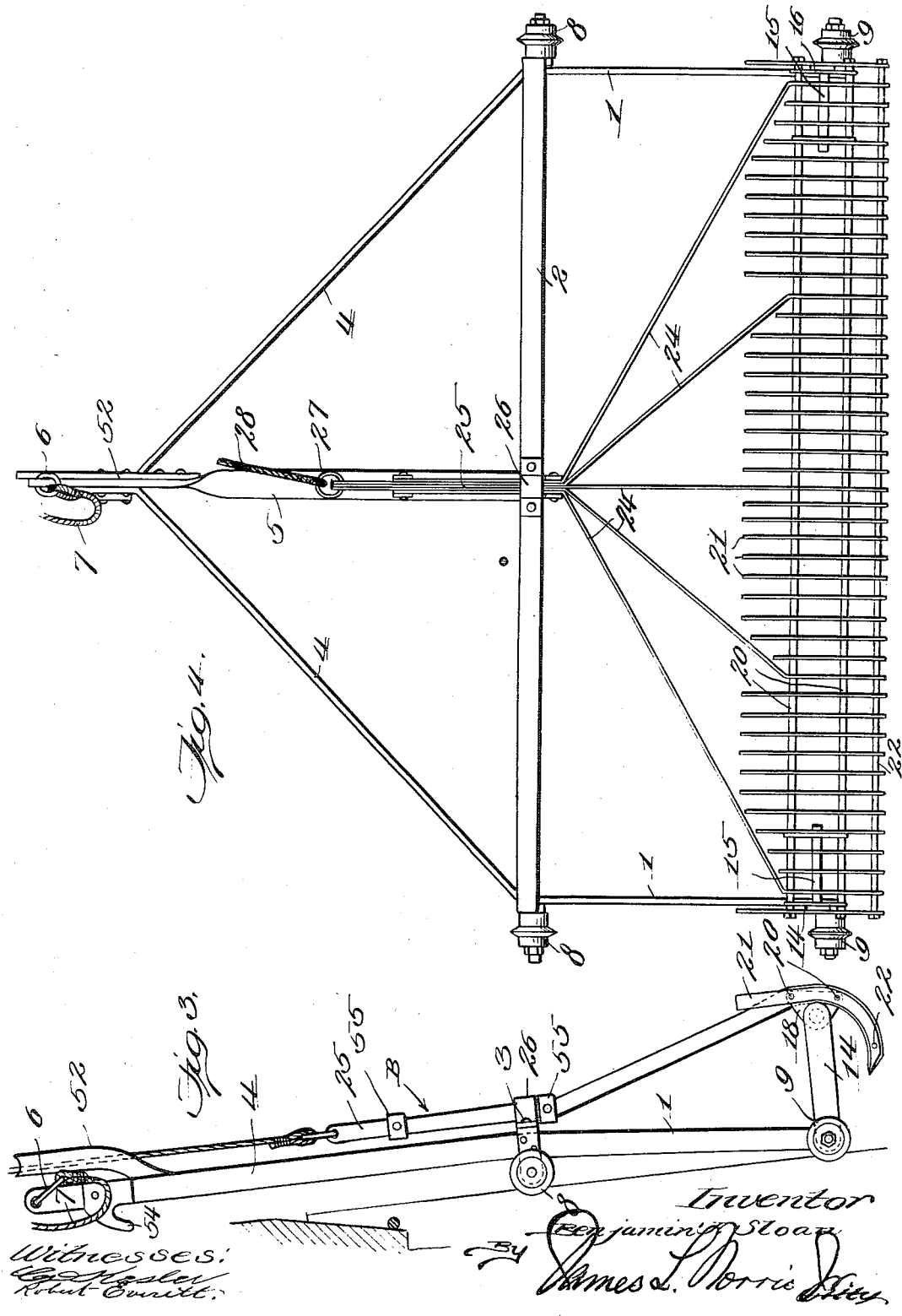

B. J. SLOAN.
RAKING MECHANISM FOR CLEANING THE GRATINGS OF WATER CHANNELS.
APPLICATION FILED AUG. 6, 1910.
986,231.
Patented Mar. 7, 1911.
3 SHEETS—SHEET 3.
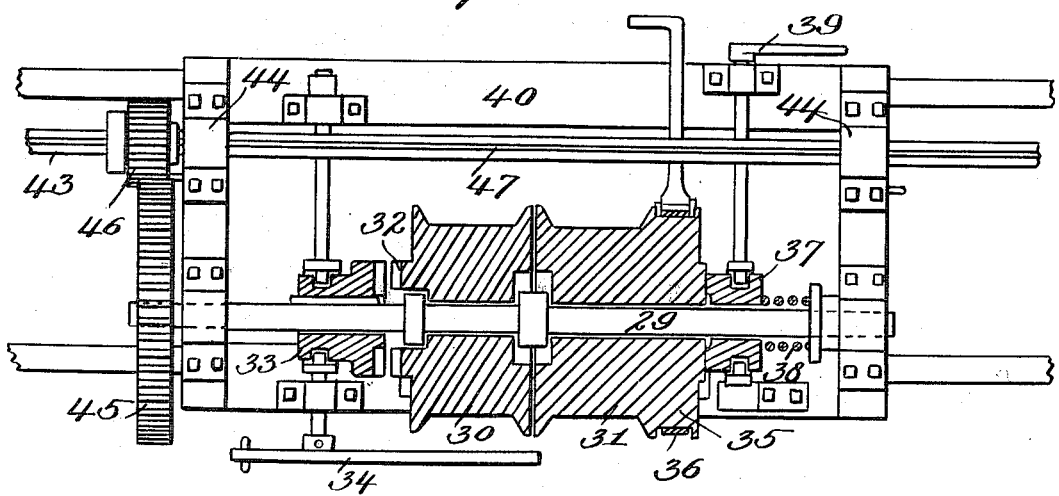
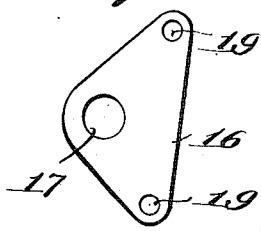
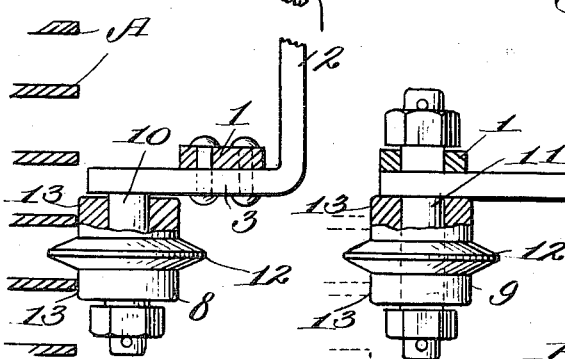
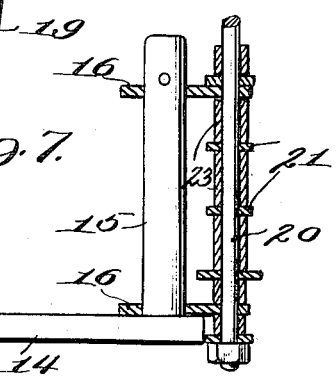
Witnesses:
Inventor
Benjamin J. Sloan
By
James L. Norris
Atty.

UNITED STATES PATENT OFFICE.

BENJAMIN J. SLOAN, OF WAYNESVILLE, NORTH CAROLINA.

RAKING MECHANISM FOR CLEANING THE GRATINGS OF WATER-CHANNELS.

986,231. Specification of Letters Patent. Patented Mar. 7, 1911.

Application filed August 6, 1910. Serial No. 575,933.

*To all whom it may concern:*

Be it known that I, BENJAMIN J. SLOAN, a citizen of the United States, residing at Waynesville, in the county of Haywood and State of North Carolina, have invented new and useful Improvements in Raking Mechanism for Cleaning the Gratings of Water-Channels, of which the following is a specification.

This invention relates to improvements in raking mechanisms for cleaning the gratings of water channels. The function of the grating is to prevent floating matter such as leaves, sticks, timber and river mud, from passing through the channels of hydraulic dams, mill races and the like, to the turbines, water wheels, or other parts of water power machinery. Eventually the grating becomes so clogged with debris that the free passage of water through the channel is obstructed and at such time a cleaning operation is necessary. To the best of my knowledge this cleaning operation is generally carried on with a hand rake. I am aware that various forms of automatic appliances have been proposed for the purpose of cleaning the gratings aforesaid but these have not proved practical and have not met with commercial favor.

The mechanism which forms the subject of the present invention includes a reciprocatory rake which embodies cleaning fingers or teeth that are displaceable as a series. This rake is of novel construction and it provides also for a novel operation.

The invention furthermore involves other novel features of construction which are adjunctive to the rake and which will be particularly specified hereinafter.

An embodiment of the invention is illustrated by way of example in the accompanying drawings, wherein—

Figure 1 is a front elevation of a raking mechanism in accordance with the present invention; Fig. 2 is a side elevation thereof; Fig. 3 is a detail side elevation of the rake *per se;* Fig. 4 is a detail front elevation of the rake *per se.* Fig. 5 is a longitudinal sectional view of the rake operating mechanism; Fig. 6 is a horizontal sectional view illustrating the upper bar of the rake frame and parts associated therewith; Fig. 7 is a horizontal sectional view illustrating a lower bar of the rake frame and parts associated therewith; and Fig. 8 is a detail view of a swinging bracket to be hereinafter specifically described.

Similar characters of reference designate corresponding parts throughout the several views.

The grating which, in the example shown, is associated with a hydraulic dam, is designated A and the raking mechanism is designated generally B. The principal parts of the raking mechanism are the rake proper and the operating means, which may be mounted upon a transversely movable carriage. The rake proper includes, *inter alia*, a main frame which has vertical reciprocatory movement with relation to the grating. This frame comprises vertical bars 1 and a horizontal bar 2. The latter is provided at its ends with inwardly directed extensions 3 to which the bars 1 are rigidly secured as shown in Fig. 6. The bars 1, at points above the bar 2, are provided with extensions 4 which converge upwardly and constitute hangers for the rake. A central hanger bar 5 is also employed, which has its lower end rigidly connected to the bar 2, centrally thereof, and its upper end connected to the adjacent ends of the extensions 4. The bar 5 projects upwardly for a short distance beyond the extensions 4 and carries a ring 6 or other device to which a cable, as 7, is attached. A traction bearing for the frame is afforded by an upper pair of rollers 8 and by a lower pair of rollers 9. The rollers 8 are mounted on studs 10 which project laterally from the extensions 3 and the rollers 9 are mounted on studs 11 which pass through the lower ends of the bars 1. The rollers 8 and 9 are similarly constructed, each having a central guide ridge 12, and bearing surfaces 13 on each side of the ridge 12. The latter engage between a pair of adjacent bars of the grating A while the surfaces 13 contact with the bars between which the ridge 12 projects. The reciprocatory movements of the rake are thus effected without friction and at the same time the rake is caused to move in a straight path which is positively determined. With the main frame thus constructed there is operatively associated a second frame which is suspended or hung from the main frame and is movable relatively thereto. The side bars of the second frame are designated 14 and may be conveniently made integral with the studs 11. The latter, by virtue of their association with the bars 1, thus constitute pivotal centers for the bars 14 which project forwardly from the bars 1 and are provided at their outer ends with inwardly projecting studs 15. Brackets 16 are mounted for swinging movement upon the studs 15. These brackets, as shown in Fig. 8, have the shape of a triangle, being provided at one corner with an opening 17 through which a stud 15 passes, and at the other corners with openings 19 through which transverse bars 20 pass. The rake teeth are shown at 21 and they are rigidly associated with the bars 20, the latter, for this purpose, passing through openings in the rake teeth, as shown in Fig. 7. The teeth 21 are of inverted gooseneck shape, having straight shanks and a curved inwardly pointing bill. The openings through which the bars 20 pass are formed in the shanks of the teeth 21. It is preferred to also associate with the teeth 21 a transverse bar 22 which is parallel to and below the bars 20 and which extends through openings in the curved bills of said teeth. The bars 20 and 22 in conjunction with the rake teeth, form a sort of a cradle or basket characterized by perpendicular and transverse intersecting parts and the cradle or basket thus constituted, is very efficient in collecting and removing debris from the grating. The proper relation of the teeth 21 to one another is maintained by spacing sleeves 23 which are provided on the bars 20.

Certain of the teeth 21 arranged at regular intervals, are formed integral with hanger bars 24 which extend upwardly in convergent relation. As shown, five of these bars 24 are employed and they terminate in parallel extensions 25 which are held against one another by suitable fastening devices and which, being thus connected, form in effect a single hanger for the second frame. The extensions 25 in their connected relation pass through a guide member 26 arranged centrally of the bar 2. At the upper end of the extensions 25 a ring 27 or equivalent device to which a cable as 28, is attached, is provided. The teeth 21 which are formed integral with the bars 24 are, for the purposes of strength and stress resistance, of slightly greater width than the other teeth 21, as shown in Figs. 3 and 7.

The rake operating mechanism is shown in Figs. 1, 2 and 5, and includes a shaft 29, upon which drums 30 and 31 are loosely mounted. The cable 7 is trained over the drum 30 and the cable 28 is trained over the drum 31. The drum 30 has a toothed clutch face 32 which coöperates with a toothed clutch member 33, keyed upon the shaft 29 and shiftable by a forked lever 34. The drum 31 is slightly spaced from the drum 30 and has an extended portion 35 at one end thereof for coöperation with a brake band 36. An additional controlling means for the drum 31 is also provided, the same consisting of a friction clutch member 37 which is keyed upon the shaft 29 and is shifted into engagement with the adjacent end face of the drum 30 by a spring 38 and out of engagement with the said end face by a forked lever 39. The shaft 29 is journaled in a carriage 40 which is slidable transversely on rails 41, these being supported by standards 42. The rake may thus be moved to different positions with respect to the grating. In order that the operations of the rake may be produced, regardless of the position of the latter, a long countershaft 43 is employed. This shaft, which is driven by a suitable motor, extends the entire width of the grating and passes through bearings 44 provided on the carriage 40. A pinion 45 is provided at one end of the shaft 29 and is in mesh with and driven by a pinion 46 which is arranged at one end of the carriage 40. The pinion 46 surrounds the shaft 43 and is provided with a rib which engages in a longitudinal groove 47 formed in the shaft 43 and coextensive therewith. The movement of the carriage 40 along the rails 41 and transversely of the grating may be effected by any suitable means. For example, two pulleys 48 are positioned at a proper distance from one another and a cable 49 is passed over the pulleys and has its ends connected to the carriage 40. One of the pulleys is turned by a hand crank to cause the movement of the carriage transversely in either direction as is obvious. The lever 34 aforesaid has an arm to which an operating rod 50 is attached and a second arm 51 which, in the operation of the arrangement, is engaged and operated by a projection 52 provided at the upper end of the main frame of the rake.

In operation the rake is first lowered, thereupon its teeth are engaged between the bars of the grating and then the rake is raised, elevating a load of debris which is caught and held in the basket constituted of the teeth 21 and the bars 20 and 22. The debris thus taken from the grating is removed from the rake in any suitable manner. The operations generally described in the foregoing paragraph are carried out in the following manner. The rake is held in its uppermost position by a displaceable catch 53 which engages a projection 54 provided on the rake adjacent the projection 52 and pointing rearwardly and downwardly. When the rake is in its uppermost position the clutch member 33 has been moved to a position wherein it is out of engagement with the clutch face 32 and remains in this position during the downward movement of the rake. In lowering the rake the band brake 36 is tightened upon the extended portion 35 of the drum 31 and the catch 53 is disengaged from the projection 54. Thereupon the rake drops by gravity but its downward movement is retarded by the action of the band brake 36. During the downward movement of the rake both of the cables 7 and 28 are unwound from their respective drums 30 and 31 although the weight of the rake is of course taken up by the cable 28. When the downward movement of the rake has continued to the desired extent, the rod 50 is thereupon manipulated to engage the clutch member 33 with the clutch face 32 of the drum 30. This engagement of the clutch member 33 provides for a positive driving of the drum 30 in a direction to rewind the cable 7 and hence to elevate the rake. Thereupon the rake commences to move upwardly. The instant that the drum 30 becomes positively driven the weight which was formerly taken up by the cable 28 is now transferred to the cable 7 and when this condition exists the second frame to which reference has been made drops with relation to the main frame from the position of Fig. 3 to the position of Fig. 2, and the teeth 21 are thereby engaged between the bars of the grating. The movement of the teeth 21 when the second frame drops, is downward and inward, since said teeth, as a series, are hung from the pivotally mounted bars 14. It will be noted that the hanger constituted of the extensions 25 has such loose play in the guide member 26 that the downward and inward movement of the teeth is not interfered with.

When the rake is moved upwardly by the cable 7, the cable 28 is also wound upon the drum 31. This is accomplished by disengaging the band brake 36 at the inception of the upward movement of the drum and thereupon the clutch 37 acts to cause the drum 31 to turn with the shaft 29. When the rake completes its upward movement, the projection 52 engages the arm 51 of lever 34 and operates the latter to disengage the clutch member 33, thus automatically stopping the action of the drum 30 and at about the same time the projection 54 passes over and is engaged by the catch 53. The rake is thus held in its uppermost position for such a period as may be desired. When it is desired to lower the rake the brake band 36 is applied in the manner explained and the catch 53 is disengaged from the projection 54. Thereupon the rake descends by gravity as has been explained. At the inception of the downward movement, the teeth 21 are moved upwardly and outwardly, that is, from the position of Fig. 2 to the position of Fig. 3, this operation resulting from the upward pull of the cable 28 which sustains the weight of the rake during its downward movement and consequently produces at the inception of the downward movement, an upward movement of the second frame with relation to the main frame. Hence during the downward movement of the rake the teeth 21 are held clear of the grating as is obvious.

It will be apparent from the foregoing description that the operative or inoperative dispositions of the teeth 21 result from respective downward or upward movements of the second frame and that such movements are consequent to the pull of the respective cables 7 or 28 which alternately sustain the weight of the rake in accordance with whether its movement is upward or downward. The upward and downward movements of the second frame with relation to the main frame are limited by stops 55 which are provided on the hanger bar constituted of the parts 25 and which engage the guide member 26.

When it is desired to shift the rake the carriage 40 is moved transversely in the manner explained. This operation is of course performed only when the rake is in its uppermost position and clear of the grating.

It is apparent that if desired two or more of the rakes may be employed for cleaning the same grating. In this case the shifting movements of each rake would be limited to a selected zone.

Having fully described my invention, I claim:

1. The combination with a grating of the character set forth, of a frame which is vertically reciprocatory in a straight path and teeth carried by the frame and movable as a series with relation to the frame to engage between the bars of the grating or to stand out from the bars of the grating.

2. The combination with a grating of the character set forth, of a frame which is vertically reciprocatory and which is provided with bearing rollers for tractive engagement with the bars of the grating and teeth carried by the frame and movable as a series with relation to the frame to engage between the bars of the grating or to stand out from the bars of the grating.

3. The combination with a grating of the character set forth, of a frame which is vertically reciprocatory and a basket-like structure carried by the frame and comprising teeth arranged to engage between the bars of the grating, and bars extending transversely of the teeth, the latter being movable as a series with relation to the frame to engage between the bars of the grating or to stand out from the bars of the grating.

4. The combination with a grating of the character set forth, of a main frame which is vertically reciprocatory in a straight path, a second frame which is vertically reciprocatory with respect to the main frame and is operatively connected thereto, and teeth movable as a series consequent to the relative reciprocations of the frames to engage between the bars of the grating or to stand out from said bars.

5. The combination with a grating of the character set forth, of a main frame which is vertically reciprocatory in a straight path and which includes connected side bars; a second frame which is vertically reciprocatory with respect to the main frame and which includes side bars that are pivoted to the side bars of the main frame, members pivoted to the side bars of the second frame, and transverse bars connecting the pivoted members; teeth carried by the transverse bars; hangers for each of the frames and cables connected to the respective hangers.

6. The combination with a grating of the character set forth, of a main frame which is vertically reciprocatory in a straight path; a second frame which is vertically reciprocatory with respect to the main frame and is operatively connected thereto, teeth movable as a series consequent to the relative reciprocations of the frames to engage between the bars of the grating or to stand out from said bars, hangers for each of the frames, cables connected to the respective hangers, a pair of freely rotatable drums over which the respective cables are trained, means for connecting one of the drums with a driving medium, and a brake associated with the other drum.

7. The combination with a grating of the character set forth, of a main frame which is vertically reciprocatory in a straight path; a second frame which is vertically reciprotary with respect to the main frame and is operatively connected thereto, teeth movable as a series consequent to the relative reciprocations of the frames to engage between the bars of the grating or to stand out from said bars, hangers for each of the frames, cables connected to the respective hangers, a pair of freely rotatable drums over which the respective cables are trained, a driven shaft passing loosely through the drums, a clutch member movable to positively connect one of the drums and the driven shaft, a brake associated with the other drum, a lever for moving the clutch member in either direction, and a projection carried by the main frame to engage the lever and cause the latter to disengage the clutch member from the drum controlled thereby, when the main frame reaches its uppermost position.

8. The combination with a grating of the character set forth, of a main frame which is vertically reciprocatory in a straight path; a second frame which is vertically reciprocatory with respect to the main frame and is operatively connected thereto, teeth movable as a series consequent to the relative reciprocations of the frames to engage between the bars of the grating or to stand out from said bars, hangers for each of the frames, cables connected to the respective hangers, a pair of freely rotatable drums over which the respective cables are trained, means for connecting one of the drums with a driving medium, a brake associated with the other drum, and a friction clutch member also associated with the last-named drum to couple the latter and the driven shaft.

9. The combination with a grating of the character set forth, of a main frame which is vertically reciprocatory in a straight path; a second frame which is vertically reciprocatory with respect to the main frame and is operatively connected thereto, teeth movable as a series consequent to the relative reciprocations of the frames to engage between the bars of the grating or to stand out from said bars, hangers for each of the frames, cables connected to the respective hangers, a pair of freely rotatable drums over which the respective cables are trained, means for connecting one of the drums with a driving medium, a brake associated with the other drum, and a transversely movable carriage carrying the drums.

10. The combination with a grating of the character set forth, of a main frame which is vertically reciprocatory in a straight path; a second frame which is vertically reciprocatory with respect to the main frame and is operatively connected thereto, teeth movable as a series consequent to the relative reciprocations of the frames to engage between the bars of the grating or to stand out from said bars, hangers for each of the frames, cables connected to the respective hangers, a pair of freely rotatable drums over which the respective cables are trained, a driven shaft passing loosely through the drums, a clutch member movable to positively connect one of the drums and the driven shaft, a brake associated with the other drum, a lever for moving the clutch member in either direction, a pinion provided on the driven shaft, a transversely shiftable carriage upon which the drums and the driven shaft are mounted, a second pinion associated with the carriage and engaging the first-named pinion, and a main driving shaft passing through the second pinion in feathered relation thereto.

11. The combination with a grating of the character set forth of a rake which comprises a frame vertically reciprocable in a plane parallel to the plane of the grating and rake teeth carried by the frame and movable as a series relatively thereto to engage between the bars of the grating or to stand out therefrom; and means operable to permit the movement of the teeth to engaging position during the upward movement of the frame and to cause the movement of the teeth away from the grating during the downward movement of the frame.

12. The combination with a grating of the character set forth of a rake which embodies a vertically reciprocatory frame and teeth movable as a series with relation to the frame to engage between the bars of the grating during the movement of the frame in an upward direction and to stand out from the bars of the grating during the movement of the frame in a downward direction.

In testimony whereof I have hereunto set my hand in presence of two subscribing witnesses.

BENJAMIN J. SLOAN.

Witnesses:
R. M. RHINEHART,
HUGH J. SLOAN.